United States Patent
Azizi et al.

(10) Patent No.: US 9,078,237 B2
(45) Date of Patent: Jul. 7, 2015

(54) METHODS AND ARRANGEMENTS FOR ORTHOGONAL TRAINING SEQUENCES IN WIRELESS NETWORKS

(71) Applicants: Shahrnaz Azizi, Cupertino, CA (US); Thomas J. Kenney, Portland, OR (US); Eldad Perahia, Portland, OR (US); Minyoung Park, Portland, OR (US)

(72) Inventors: Shahrnaz Azizi, Cupertino, CA (US); Thomas J. Kenney, Portland, OR (US); Eldad Perahia, Portland, OR (US); Minyoung Park, Portland, OR (US)

(73) Assignee: Intel Corporation, Santa Clara, CA (US)

(*) Notice: Subject to any disclaimer, the term of this patent is extended or adjusted under 35 U.S.C. 154(b) by 69 days.

(21) Appl. No.: 13/730,989

(22) Filed: Dec. 29, 2012

(65) Prior Publication Data

US 2013/0272198 A1 Oct. 17, 2013

Related U.S. Application Data

(60) Provisional application No. 61/623,984, filed on Apr. 13, 2012.

(51) Int. Cl.
- *H04W 4/00* (2009.01)
- *H04W 72/02* (2009.01)
- *H04L 5/00* (2006.01)
- *H04L 27/26* (2006.01)

(52) U.S. Cl.
CPC ............. *H04W 72/02* (2013.01); *H04L 5/0048* (2013.01); *H04L 27/2613* (2013.01)

(58) Field of Classification Search
CPC ........................................................ H04L 5/00
USPC ........................................ 370/328; 375/295
See application file for complete search history.

(56) References Cited

U.S. PATENT DOCUMENTS

| 7,068,631 B2 * | 6/2006 | Eriksson et al. ............... 370/337 |
| 8,428,175 B2 * | 4/2013 | Chrabieh ....................... 375/295 |
| 8,737,189 B2 * | 5/2014 | Hansen et al. ................. 370/203 |

(Continued)

FOREIGN PATENT DOCUMENTS

WO 2013/155322 A1 10/2013

OTHER PUBLICATIONS

International Search Report and Written Opinion received for PCT Patent Application No. PCT/US2013/036199, mailed Jul. 24, 2013, 11 pages.

(Continued)

*Primary Examiner* — Wei Zhao
(74) *Attorney, Agent, or Firm* — Schubert Law Group PLLC (57) ABSTRACT

Logic may implement an orthogonal frequency division multiplexing (OFDM) system operating in the one gigahertz and lower frequency bands. Logic may detect new long training sequences that are differentially orthogonal to each other for a first bandwidth mode of operation such as a one megahertz mode as well as differentially orthogonal to half of the long training sequence for a second bandwidth mode of operation such as a two megahertz or greater mode. Logic may implement two or more long training sequences for the first bandwidth mode of operation to transmit information based upon the selection of the particular long training sequence for the transmission. Logic may implement a new acknowledgement packet comprising a short training sequence and a long training sequence without a signal field and without a payload. And logic may implement bandwidth detection logic to classify a transmission based upon orthogonal properties of the long training sequences.

30 Claims, 7 Drawing Sheets

(56) References Cited

U.S. PATENT DOCUMENTS

| | | |
|---|---|---|
| 8,750,215 B2 | 6/2014 | Azizi et al. |
| 2009/0080454 A1* | 3/2009 | Koyanagi ..................... 370/445 |
| 2009/0143030 A1* | 6/2009 | Hammerschmidt et al. .... 455/91 |
| 2011/0013607 A1 | 1/2011 | Van Nee et al. |
| 2011/0051747 A1 | 3/2011 | Schmidl et al. |
| 2011/0142020 A1 | 6/2011 | Kang et al. |
| 2011/0170627 A1 | 7/2011 | Kwon et al. |
| 2011/0255488 A1 | 10/2011 | Lee et al. |

OTHER PUBLICATIONS

International Preliminary Report on Patentability and Written Opinion received for PCT Patent Application No. PCT/US2013/036199, mailed on Oct. 23, 2014, 8 pages.

\* cited by examiner

NOTE THAT IN FIGS 1A-B:
N=10 FOR IEEE 802.11AH DEVICES
X=1 FOR 1 MHZ IEEE 802.11AH DEVICES
(FOR 2X REPETITION)

METHODS AND ARRANGEMENTS FOR ORTHOGONAL TRAINING SEQUENCES IN WIRELESS NETWORKS

BACKGROUND

Embodiments are in the field of wireless communications. More particularly, embodiments are in the field of communications protocols between wireless transmitters and receivers.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Embodiments may implement an orthogonal frequency division multiplexing (OFDM) system operating in the one gigahertz and lower frequency bands. Some embodiments may detect new long training sequences that are differentially orthogonal to each other for a first bandwidth mode of operation such as a one megahertz mode as well as differentially orthogonal to half of the long training sequence for a second bandwidth mode of operation such as a two megahertz or greater mode. In several embodiments, logic may implement two or more long training sequences for the first bandwidth mode of operation to transmit information based upon the selection of the particular long training sequence for the transmission. In some embodiments, the logic may implement a new acknowledgement packet comprising a short training sequence and a long training sequence without a signal field and without a payload. And in further embodiments, logic may implement bandwidth detection logic to classify a transmission based upon orthogonal properties of the long training sequences.

In Institute of Electrical and Electronic Engineers (IEEE) 802.11ah systems, the operational bandwidths defined are one megahertz (MHz) and a set of down-clocked IEEE 802.11ac bandwidths, namely 2, 4, 8 and 16 MHz, where the down clocking is 10×. The 1 MHz rate is not derived from the IEEE 802.11n/ac bandwidth, and thus this mode is being designed more or less independently. The 1 MHz system uses a 32-point fast Fourier transform (FFT) as opposed to the minimum of a 64-point FFT in IEEE 802.11ac devices). Of those 32 subcarriers, 24 will be used for data and 2 for pilot. Additionally, a repetition mode is being included, which provides for longer range communications.

With the inclusion of this mode, a new preamble design is needed to support the new tone counts. Thus, in many embodiments the design of the 1 MHz preamble is compatible with the 2/4/8 and 16 MHz IEEE 802.11ah system, which is just a down-clocked version of the IEEE 802.11ac system.

Figure 1:
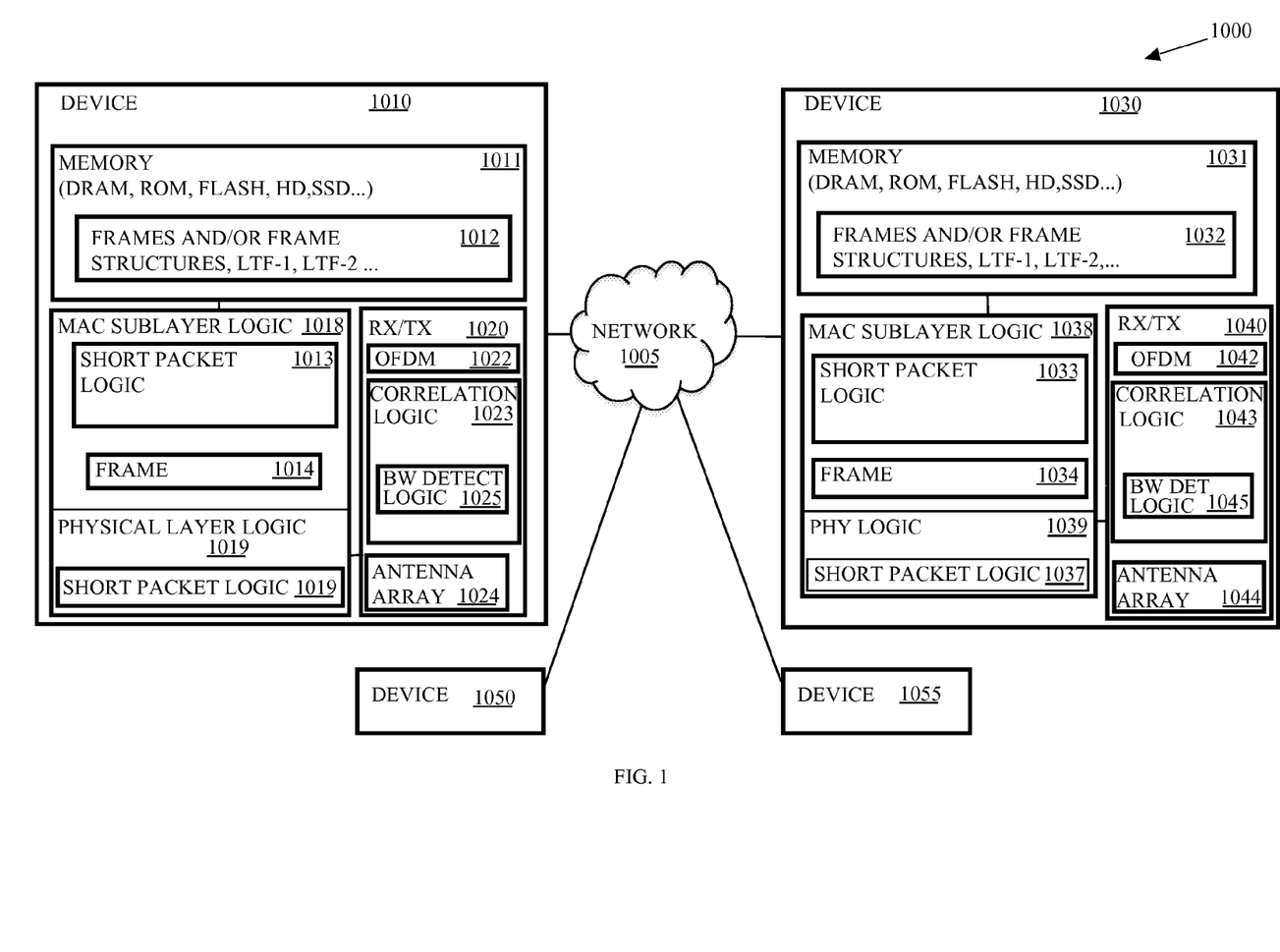
FIG. 1 depicts an embodiment of an example wireless network comprising a plurality of communications devices, including multiple fixed or mobile communications devices.
Figure 1A:
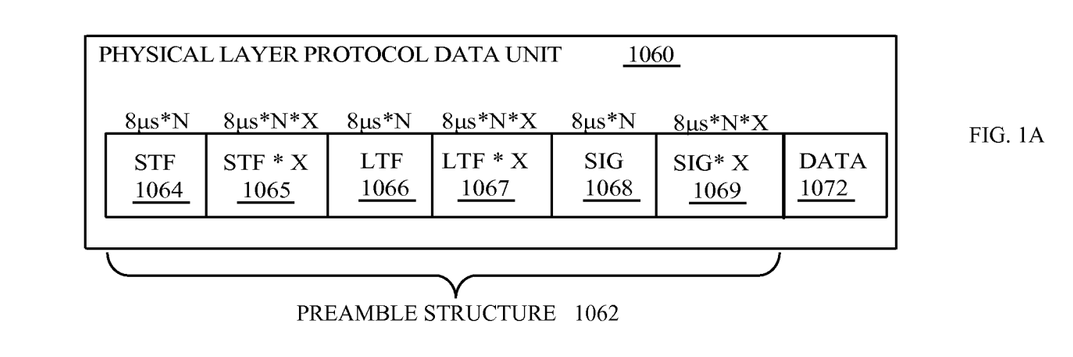
FIG. 1A depicts an embodiment of a physical layer protocol data unit generated by physical layer logic of FIG. 1 for IEEE 802.11ah, 1 stream, 1 MHz bandwidth operation.

To this end, the 1 MHz preamble, as shown in FIG. 1A, will have the same structure as in the other bandwidths, meaning it will have a Short Training Field (STF), Long Training Field (LTF) and a Signal Field (SIG) for a 1 Stream transmission. For multi-stream transmissions additional LTF's follow the SIG. Additionally, a repetition mode was added to allow transmissions at greater ranges then that of the IEEE 802.11ac system. Because of this mode, the preamble needs to be designed with repetition as well to allow detection of the repetition mode at greater distances. Both the STF, and the LTF sequences may use a 2 times (2×) repetition, which means rather than including one STF and one LTF there will be two STFs and two LTFs. Additionally, the SIG will use a 2× repetition as well so there will be two SIGs included in the transmission at 1 MHz bandwidth. In many embodiments, this repetition is used for all modulation and coding schemes (MCS's) supported in 1 MHz bandwidth regardless of the whether the data payload is using repetition or not.

Various embodiments may be designed to address different technical problems associated with the length of the preamble, which is particularly an issue in systems that use a 2× repetition of fields. For instance, some embodiments may be designed to address one or more technical problems such as designing fields for the preamble to reduce the length of the preamble, communicating information without adding more bits to the SIG; reducing the length of acknowledgements; detecting the bandwidth of a transmission; and increasing efficiency in identifying incoming transmissions.

Different technical problems such as those discussed above may be addressed by one or more different embodiments. For instance, some embodiments that address the length of the preamble may do so by one or more different technical means such as defining new long training fields that carry additional information, defining differentially orthogonal long training sequences that are differentially orthogonal to other bandwidths, defining a short acknowledgement packet that is identifiable by information provided by the long training sequence, defining a short acknowledgement that comprises a short training field and a long training field without a SIG and without a payload, defining a detector for orthogonal properties of the long training sequences to classify transmission bandwidths, and the like.

Some embodiments may provide, e.g., indoor and/or outdoor "smart" grid and sensor services. For example, some embodiments may provide sensors to meter the usage of electricity, water, gas, and/or other utilities for a home or homes within a particular area and wirelessly transmit the usage of these services to a meter substation. Further embodiments may utilize sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may integrate low power wireless communications like Bluetooth®, wireless local area networks (WLANs), wireless metropolitan area networks (WMANs), wireless personal area networks (WPAN), cellular networks, Institute of Electrical and Electronic Engineers (IEEE) IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2012.pdf), communications in networks, messaging systems, and smart-devices to facilitate interaction between such devices. Furthermore, some wireless embodiments may incorporate a single antenna while other embodiments may employ multiple antennas.

Turning now to FIG. 1, there is shown an embodiment of a wireless communication system 1000. The wireless communication system 1000 comprises a communications device 1010 that is wire line or wirelessly connected to a network 1005. The communications device 1010 may communicate wirelessly with a plurality of communication devices 1030, 1050, and 1055 via the network 1005. The communications devices 1010, 1030, 1050, and 1055 may comprise sensors, stations, access points, hubs, switches, routers, computers, laptops, notebooks, cellular phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a communications device such as the communications device 1030 and the communications device 1030 may be integrated with or coupled to a water meter usage meter. The communications device 1030 may initiate communications with the metering substation to transmit data related to water usage and may reside a significant distance away from the communications device 1010.

The communications device 1010 may respond to the receipt of the data with a short (or truncated) acknowledgement (ACK). For instance, in some embodiments, the communications device 1030 may operate on a 1 MHz bandwidth in an IEEE 802.11ah system with a single stream transmission. The communications device 1010 may select a short ACK with the assumption that it is unlikely that another, low power sensor may be powered on at the time the communications device 1010 transmits the short ACK. For one, the communications device 1030 may have initiated the communication during a restricted window access period or at a targeted wake time. And in some situations, the communications device 1030 may have transmitted a network allocation vector that provides the other low power sensors an opportunity to enter a doze state during the exchange between the communications devices 1010 and 1030.

The communications device 1010 may comprise short packet logic 1013 in the MAC sublayer logic 1018 to determine an appropriate time to transmit the short ACK or another short packet and the short packet logic 1017 may receive the indication and select the appropriate long training sequence (LTF) from a list of two or more LTFs such as LTF-1 and LTF-2 to include in the short ACK packet to identify the short packet as a short ACK to the correlation logic 1043. In many embodiments, there are many LTFs. The LTFs in the present embodiment are differentially orthogonal with one another so their cross-correlation with each other results in a zero. The correlation logic 1043 may, e.g., cross-correlate the received LTF against the LTF sequence to determine whether the received LTF sequence is the same. Note that cross-correlating the LTF against itself would be an autocorrelation, which would result, ideally, in one. The uncorrected channel influence may vary and event the corrected channel influence would result in a value differing from one.

The LTF-1 and LTF-2 may comprise:

LTF-1=[0,0,0,−1,1,1,−1,−1,1,1,−1,−1,1,−1,1,1,1,1,0,1,1,
  1,−1,−1,1,1,1,1,−1,1,−1,1,0,0]

LTF-2=[0,0,0,−1,−1,−1,1,1,−1,−1,−1,−1,−1,−1,1,1,0,−
  1,1,−1,1,1,1,−1,1,1,−1,1,−1,−1,1,0,0]

Figure 1B:
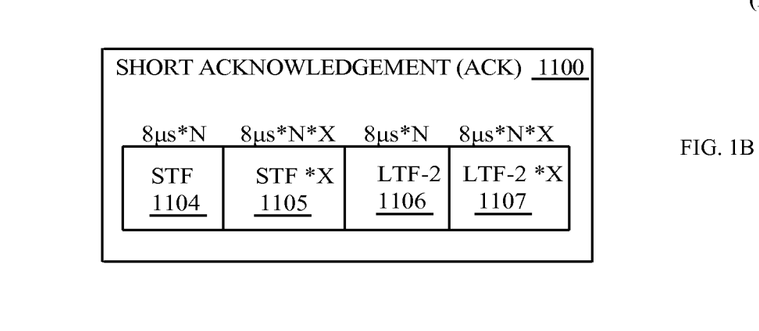
FIG. 1B depicts an embodiment of a short acknowledgement for the system in FIG. 1.

In the present embodiment, the communications device 1010 has defined LTF-2 as being associated with the short ACK so the short packet logic 1017 of the physical layer (PHY) logic 1019 may select the LTF-2 and build and transmit a packet comprising a short training sequence (STF) and the LTF-2. As a result of the 2× repetition in the 1 MHz bandwidth operation mode of IEEE.802.11ah, both the STF and the LTF-2 may be repeated such as is illustrated by short ACK 1100 in FIG. 1B. As illustrated in FIG. 1B, 2× repetition sets X=1 and, 4× repetition would set X=3.

The LTF-1 and LTF-2 may also be designed to have a zero cross-correlation with the 2/4/8 and 16 MHz LTF sequences such that the communications device 1030 can cross correlate the 1 MHz LTF (LTF-1 or LTF-2) with the received LTF, and can perform hypothesis testing to detect and classify the 1 MHz operation bandwidth from other operation bandwidths 2/4/8 and 16 MHz. As mentioned, the two or more 1 MHz LTF sequences (such as T sequences) may be defined to have not only zero cross-correlation with the 2/4/8 and 16 MHz LTF sequences, but also have zero cross-correlation with each other. As a result, the set of two or more sequences (e.g., T orthogonal sequences) may be used to carry one additional (or $\text{Log}_2(T)$ additional) information in the transmitted packet without adding bits to the SIG or the payload. This not only improves system throughput, but more importantly improves battery life, which is very critical in sensor applications. Also, using one of the sequences to indicate a short ACK transmission improves system throughput and improves battery life. In this case the packet is a short ACK packet consists of just the STF and LTF sequences, no SIG or data payload is needed.

In the present embodiment, LTF-1 and LTF-2 are designed to be block-by-block differentially orthogonal to each half of the (2 MHz) 64 FFT LTF sequence to allow 1 MHz versus 2 MHz mode classification. In addition, the two sequences are block-by-block differentially orthogonal to each other allowing detection of one versus another besides the two halves of 2 MHz LTF. Several embodiments comprise LTF-1 through LTF-N sequences.

Consider a binary preamble sequence LTF-1 (or LTF-2 or one-half-2 MHz-LTF) is transmitted. Let R be the received preamble symbol after being passed through a channel H, and undergoing an N-point FFT operation. The communications device 1030 may divide the received sequence R, and known preamble sequence LTF-1 (or LTF-2) into two blocks of size Nb1 and Nb2, or in other embodiments, Nb1, Nb2, through Nb1. The communications device 1030 has a bandwidth detection logic 1045 defined as:

$$\arg\max\{BDD(R,P)\}$$

where arg max { . . . } is the maximum resulting argument from the performing the calculations for each member of the set of P.
where P is a member of the set:

$$P \in \{\text{LTF-1}, \text{LTF-2}, \text{half-2 MHz-LTF}\}$$

where R is the received sequence and P is a set comprising (LTF-1, LTF-2, and half of a 2 MHz LTF). Note that in this embodiment, there are only two LTFs. For embodiments in which there are T LTFs, P would be a set comprising (LTF-1 through LTF-T, and half of a 2 MHz LTF).

The communications device 1030 has a frequency domain differential detector defined as:
BDD(R,P) which is a function defined as the sum of DDbl (Rl, Pl):

$$BDD(R, P) = \sum_{l} DD_{Bl}(R_l, P_l)$$

Assuming that R is the received sequence equivalent to P, the autocorrelation of P would have a magnitude of one and the correlation of the received sequence with the signal prior to being transmitted through the channel H would generate approximately a value associated with the channel multiplied by one as shown in the example below:

$$DD_{Bl}(R_l, P_l) = \sum_{k=1}^{N_{Bl}-1} (r_{l,k} r^*_{l,k+1}) \cdot (p_{l,k} p^*_{l,k+1})^*$$

$$= \sum_{k=1}^{N_{Bl}-1} [(p_{l,k} h_{l,k} + n_{l,k})(p^*_{l,k+1} h^*_{l,k+1} + n_{l,k+1})] \cdot (p_{l,k} p^*_{l,k+1})^*$$

$$\approx \sum_{k=1}^{N_{Bl}-1} h_{l,k} h^*_{l,k+1}$$

-continued $$\approx \sum_{k=1}^{N_{Bl}-1} |h_{l,k}|^2$$

wherein $r_{l,}$ and $p_{l,k}$ are frequency domain representations of the kth element in the sequences R and P in block Nb1. Note also that for a binary sequence:

$$p_{l,k} p^*_{k+1} = \pm 1$$

Note that for any two sequences P and Q wherein P and Q are members of the set of {LTF-1, LTF-2, half-2 MHz-LTF}, block-by-block differentially orthogonal is defined as:

$$\sum_{k=1}^{N_{Bl}-1} (p_{l,k} p^*_{l,k+1}) \cdot (q_{l,k} q^*_{l,k+1})^* = 0$$

The communications device 1030 may also include short packet logic 1033 to instruct the short packet logic 1037 of the PHY logic 1039 to generate and transmit a short packet such as other types of short control frames, such as Short-RTS, Short-CTS, and Short-PS-Poll, by using T orthogonal LTF sequences. In further embodiments, more than one short packets may use LTF-2. And, in one embodiment the use of LTF-2 may indicate that a packet embodies a pilot-rotation scheme (or midamble) for tracking high-doppler.

The communications device 1030 may receive the short ACK and the correlation logic 1043 may identify the LTF as an LTF-2, which is indicative of a short ACK. The communications device 1010 may implement correlation logic 1023 and bandwidth detection logic 1025 to classify the bandwidth of an incoming transmission and to correlate the incoming transmission with, e.g., a predicted or expected packet.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, medium access control (MAC) sublayer logic 1018 and 1038, and physical layer (PHY) logic 1019 and 1039, respectively. The memory 1011 and 1031 may comprise a storage medium such as dynamic random access memory (DRAM), read only memory (ROM), buffers, registers, cache, flash memory, hard disk drives, solid-state drives, or the like. The memory 1011 and 1031 may store frames and/or frame structures, preambles, or portions thereof such as structures for a short ACK, a short RTS, a short CTS, a short POLL, an LTF-1 and an LTF-2 through an LTF-T, an association request frame, an association response frame, a probe frame, and the like.

The MAC sublayer logic 1018, 1038 may generate the frames and physical layer data units (PPDUs). In some embodiments, the MAC sublayer logic 1018, 1038 may also comprise short packet logic 1013, 1033 to transmit an indication to physical layer logic 1021, 1041 to transmit a short packet. For instance, the communications device 1030 may be integrated with a sensor that makes measurements of the environment in the vicinity of the communications device 1030 and the communications device 1010 may periodically poll or otherwise provide the communications device 1030 with an opportunity to transmit a data packet including data related to the measurements to communications device 1010. In response, communications device 1010 may transmit a short poll packet with an LTF such as an LTF-3 (without a SIG or payload) that indicates to the communications device 1030 that the packet is a poll.

The communications devices 1010, 1030, 1050, and 1055 may each comprise a transceiver (RX/TX) such as transceivers (RX/TX) 1020 and 1040. The transceivers (RX/TX) 1020 and 1040 may comprise physical (PHY) layer logic 1021 and 1041, respectively. The physical (PHY) layer logic 1021, 1041 may comprise short packet logic to select an appropriate LTF and generate a short packet for transmission as well as correlation logic 1023, 1043 to receive and detect a short packet. In many embodiments, physical (PHY) layer logic 1021, 1041 may have correlation logic 1022, 1042 to detect the short packets. The correlation logic 1022, 1042 may store known short acknowledgements or known truncated packets in memory or hardcoded into or implemented in logic circuitry in the correlation logic 1022, 1042. And the correlation logic 1022, 1042 may compare the known LTFs with the received communication to determine if the received communication comprises a short packet. This approach works well with sensor networks where sensors are transmitting very infrequently. Thus, when a sensor is transmitting or receiving, it is very likely it is the only device doing so in its own base service set (BSS).

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data as OFDM symbols. The OFDM symbols are divided into several parallel data streams or channels, one for each sub-carrier and encoded with the sub-carriers by which the OFDM symbols will be transmitted to a receiving device such as twenty-four data sub-carriers, five guard sub-carriers, two pilot sub-carriers, and one DC subcarrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. And guard tones may help the signal conform to a spectral mask. The nulling of the direct component (DC) may be used to simplify direct conversion receiver designs. And guard intervals may be inserted between symbols such as between every OFDM symbol as well as between the short training field (STF) and long training field (LTF) symbols by the front-end of the transmitter during transmission to avoid inter-symbol interference (ISI), which might result from multi-path distortion.

While the embodiments herein are described in conjunction with single stream operation, embodiments described in FIG. 1 may comprise multiple stream capabilities. For instance, FIG. 1 may depict embodiments with a number of different capabilities including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

In the present embodiment, the antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and is capable of communicating with IEEE 802.11ah devices.

FIG. 1A depicts an embodiment of a physical layer protocol data unit (PPDU) 1060 with a preamble structure 1062 for establishing communications between wireless communication devices such as communications devices 1010. 1030, 1050, and 1055 in FIG. 1 for single stream operation and 1 MHz bandwidth operation. The PPDU 1060 may comprise a preamble structure 1062 including orthogonal frequency division multiplexing (OFDM) training symbols for a single Multiple Input, Multiple Output (MIMO) stream followed by a signal field, and the preamble structure 1060 may be followed by the data 1072 payload. In particular, the PPDU 1060 may comprise a short training field (STF) 1064 followed by X repetitions of the STF 1065, a long training field (LTF) 1066 followed by X repetitions of the LTF 1067, and the signal field (SIG) 1068 followed by X repetitions of the SIG field 1069. The X repetitions may be 2 repetitions in the present embodiment. The preamble structure 1062 may be followed by data 1072, which is the payload of the PPDU 1060.

The STF 1064 may comprise a number of short training symbols such as 10 short training symbols that are 0.8 microseconds (µs) times N in length, wherein N is an integer representing the down-clocking factor from a 20 MHz channel spacing relative to a 2 MHz bandwidth. Thus, the downclocking to get a 20 MHz to 2 MHz is simply 20/2=10. The total time frame for the STF 1064 at a 20 MHz channel spacing is 8 µs. The total time frame for the STF at the downclocked bandwidths of 1, 2, 4, 8 and 16 is 8 us*10=80 us. The STF*X 1065 may comprise one to four additional repetitions of the STF 1064 so the total time frame may be 80 µs times 10 times X. In some embodiments, the preamble structure 1062 may only include repetitions of the STF 1064 and not repetitions of the LTF 1066 and SIG field 1068. In further embodiments, the preamble structure 1062 comprises repetitions of the LTF 1066 and/or SIG field 1068. As illustrated in FIG. 1A.

The LTF 1066 may comprise a guard interval (GI) symbol and two long training symbols. The guard interval symbol may have a duration of 16 µs times and each of the long training symbols may have durations of 32 µs times 10 at the 1, 2, 4, 8 and 16 MHz bandwidths. The total time frame for the LTF 1066 at a 1, 2, 4, 8 and 16 MHz bandwidths is 80 μs. The LTF*X 1067 may comprise one to four additional repetitions of the LTF 1066 so the total time frame may be 80 μs times X.

The SIG field 1068 may comprise a guard interval (GI) symbol at 8 μs and signal field symbols at 72 μs. The data 1072 may comprise one or more MAC sublayer protocol data units (MPDUs) and may include one or more GIs. For example, data 1072 may comprise one or more sets of symbols including a GI symbol at 8 μs followed by payload data at 32 μs.

Note that while the logic for the physical layer and MAC sublayer are illustrated as separate units interconnected with the transceivers, in some embodiments, the logic may be integrated with one or more other devices to implement the same functionality.

FIG. 1B depicts an embodiment of a short ACK PPDU 1100 for establishing communications between wireless communication devices such as communications devices 1010, 1030, 1050, and 1055 in FIG. 1 for single stream operation and 1 MHz bandwidth operation. The short ACK 1100 may comprise a preamble structure 1102 including orthogonal frequency division multiplexing (OFDM) training symbols for a single Multiple Input, Multiple Output (MIMO) stream without a signal field and without a data payload. In particular, the PPDU 1100 may comprise a short training field (STF) 1104 followed by one repetition of the STF 1105 and a long training field 2 (LTF-2) 1106 followed by one repetition of the LTF 1107.

The STF 1104 may comprise a number of short training symbols such as 10 short training symbols that are 0.8 microseconds (μs) times N in length, wherein N is an integer representing the down-clocking factor from a 20 MHz bandwidth to a 2 MHz bandwidth and thus is 10.

The LTF-2 1106 may comprise a guard interval (GI) symbol and two long training symbols. The guard interval symbol may have a duration of 16 μs and each of the long training symbols may have durations of 3.2 us times N. In the present embodiment, the LTF-2 may comprise 32 symbols and LTF-2 may be defined as:

LTF-2=[0,0,0,−1,−1,−1,1,1,−1,−1,−1,−1,−1,−1,1,1,0,−1,1,−1,1,1,1,−1,1,1,1,−1,1,−1,−1,0,0]

Figure 1C:
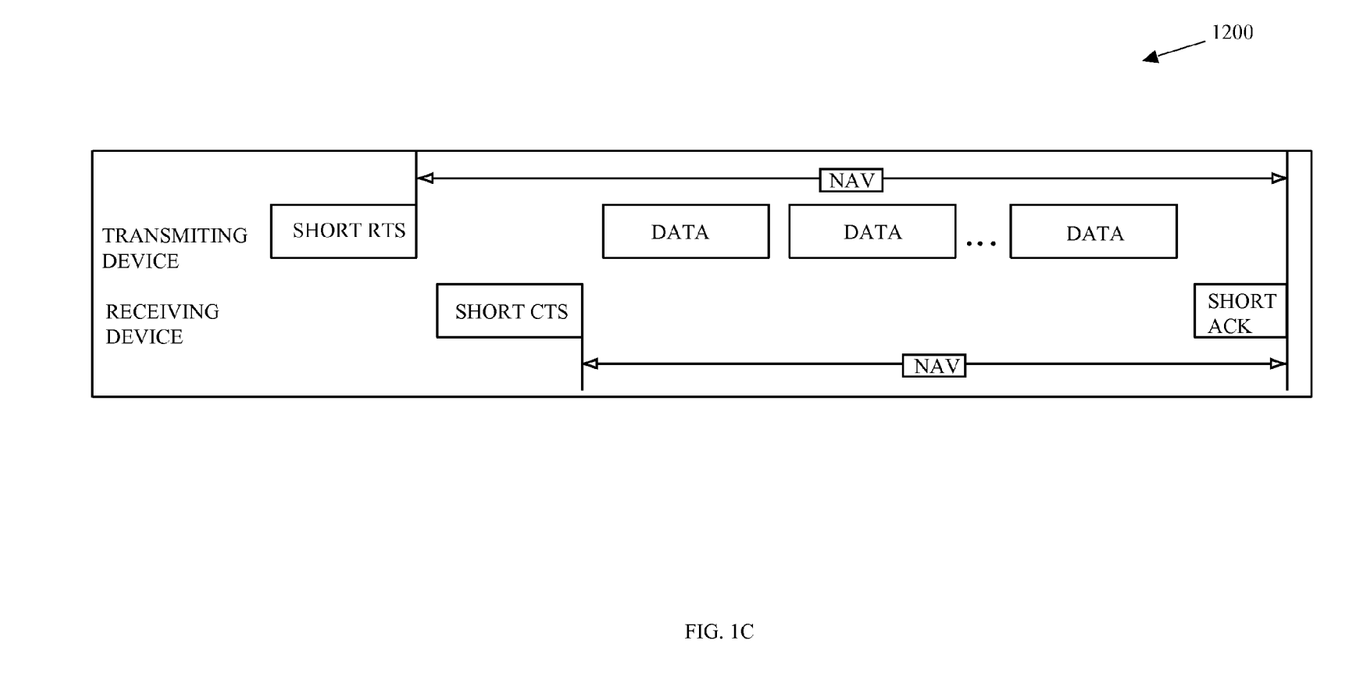
FIG. 1C depicts an embodiment of a protocol with a protection mechanism for acknowledging communications between wireless communication devices for the system in FIG. 1.

FIG. 1C illustrates an embodiment 1200 of an operation of one of the functions of a frame. In particular, FIG. 1C illustrates the use on a protected transmission operation (TxOP) for embodiments. Some embodiments may utilize the protected TXOP to inform devices other than the receiver prior to transmission of the frame that the other devices should refrain from transmitting for a particular duration of time. The particular duration of time may be time allocated for transmitting the frame.

As illustrated in FIG. 1F, to establish communications, a transmitting device transmits a short control frame that is a Request To Send (RTS) that is received by a receiver and is identifiable by an LTF associated with the RTS. After the RTS signal is sent, but before the data of the transmission is sent, the transmitting device waits to receive a Clear To Send (CTS) signal from the receiver. The CTS may comprise an LTF that is associated only with the CTS so the CTS can be identified by the receiver. If the CTS is not received within a short period of time, the intended transmission is temporarily abandoned and a new RTS signal may be sent later. Once the CTS signal is received in response to the RTS, the transmitting device sends the data during the duration of the NAV, as shown in FIG. 1C. If the data is successfully received, the MAC sublayer logic of the receiving device indicates to the physical layer logic of the receiving device that a short acknowledgement should be transmitted and the physical layer logic transmits a short acknowledgment (short ACK) signal to the transmitter. If an ACK signal is not received, the MAC sublayer logic of the receiver may immediately schedule a retransmission.

Figure 1D:
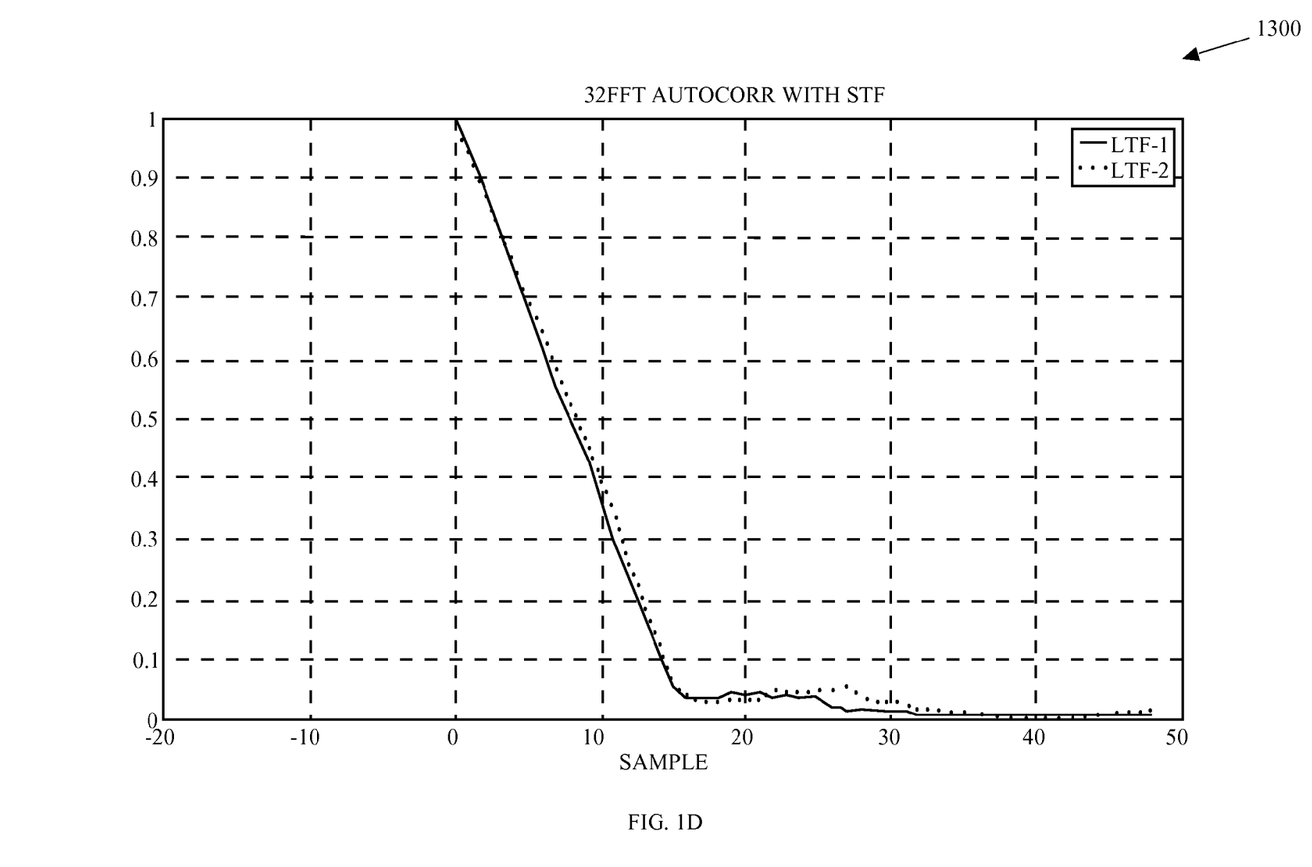
FIG. 1D depicts an embodiment of a graph of a cross-correlation between STF and LTF-1 and LTF-2 for the system in FIG. 1.

FIG. 1D depicts an embodiment of a graph of a cross-correlation between STF and LTF-1 and LTF-2 for the system in FIG. 1. The other desirable characteristic is to have the cross correlation between the Short Training Field (STF) with the LTFs such as LTF-1 and LTF-2 have a sharp drop-off so the transition between the STF and LTF transition is clear, and so that the STF does not create a false detect by being highly correlated to the LTF. The two sequences, LTF-1 and LTF-2, defined herein have cross-correlation between the STF and LTF as depicted in FIG. 1D.

Figure 2:
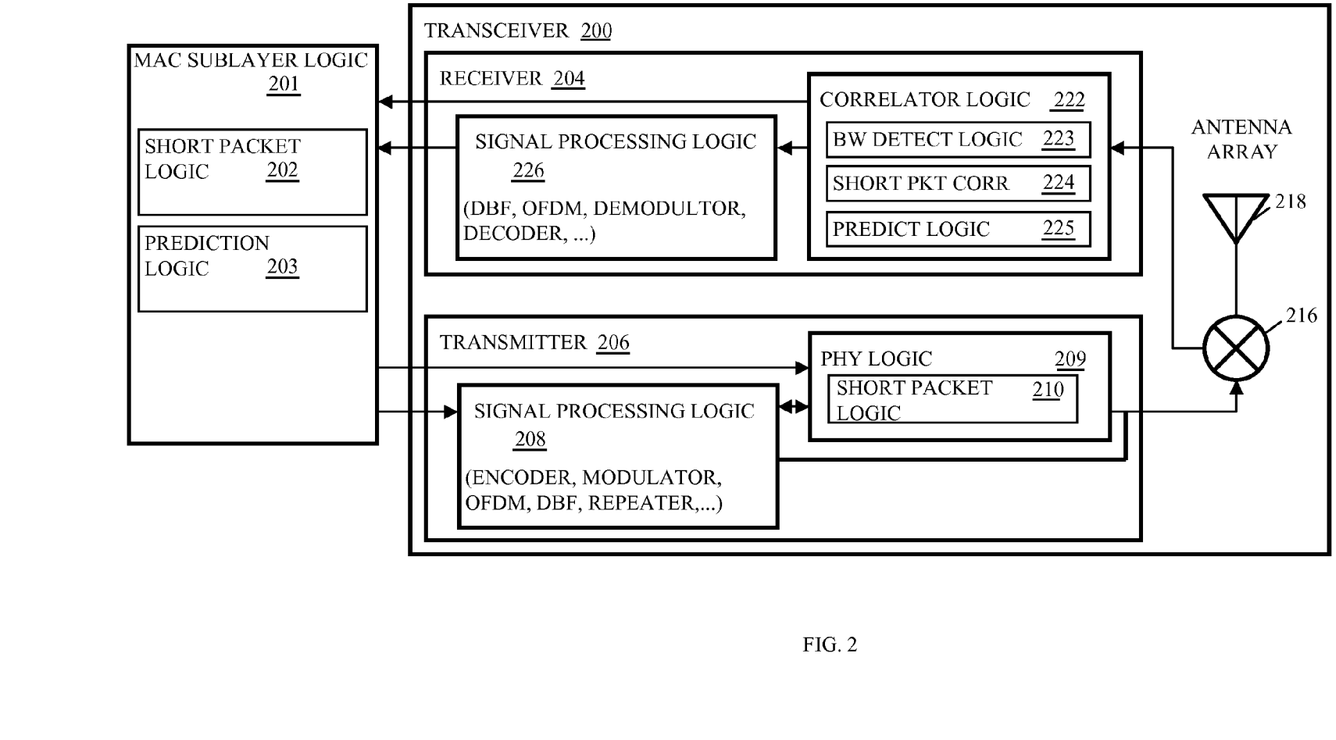
FIG. 2 depicts an embodiment of an apparatus to generate and transmit an Orthogonal Frequency Division Multiplexing (OFDM)-based communication in a wireless network.

FIG. 2 illustrates an embodiment of an apparatus to transmit an orthogonal frequency division multiplexing (OFDM)-based communication in a wireless network. The apparatus comprises a transceiver 200 coupled with Medium Access Control (MAC) sublayer logic 201. In general, the MAC sublayer logic 201 may generate a PPDU to transmit via transceiver 200. In the present embodiment, the MAC sublayer logic 201 may comprise acknowledgement (ACK) logic 202 to transmit an indication to the transceiver 200 to transmit a short acknowledgement. For instance, MAC sublayer logic 201 may determine that a transmission has been successfully received from a communications device and may instruct the short packet logic 210 of the physical layer logic 209 of the transceiver 200 to transmit a short acknowledgement to the communications device to acknowledge receipt of the transmission. The indication of the short acknowledgement may be an indication to transmit a truncated packet that comprises the STF and an LTF such as LTF-2 that identifies the packet as an ACK in lieu of transmitting a packet that comprises a preamble and a data payload.

The transceiver 200 comprises a receiver 204 and a transmitter 206. The transmitter 206 may comprise signal processing logic 206 and an acknowledgement determiner 210. The signal processing logic 208 comprises circuitry for processing packets such as a physical layer protocol data unit (PPDU) for transmission via the antenna array 218. The signal processing logic 206 may comprise one or more of an encoder, a modulator, an orthogonal frequency division multiplexer (OFDM), a digital beam former (DBF) and/or other signal processing units. The encoder may receive data destined for transmission from the MAC sublayer logic 202. The modulator may receive data from the encoder to transform each block of binary data received from encoder into a unique continuous-time waveform that can be transmitted by an antenna upon up-conversion and amplification. The output of modulator may be fed to an OFDM to impress the modulated data from modulator onto a plurality of orthogonal sub-carriers. And the output of the OFDM may be fed to the DBF to use digital signal processing algorithms that operate on the signals received by, and transmitted from, an array of antenna elements to steer a plurality of spatial channels independently to maximize the signal power transmitted to and received from each of a plurality of user terminals.

The short packet logic 210 may couple with the MAC sublayer logic 201 to receive an indication to transmit a short acknowledgement. In response to the indication, the short packet logic 210 may determine the short acknowledgment, wherein the short acknowledgement comprises a truncated packet with an STF and an LTF-2 to identify the truncated packet as the short acknowledgement. For instance, the short packet logic 210 may comprise logic to select a truncated packet to output and may transmit the truncated packet as the short acknowledgement to the antenna array 218 for transmission to a receiving device.

In some embodiments, the short packet logic 210 may comprise logic to select a truncated packet from a set of more than one truncated packets to transmit to a receiving device. For example, the short packet logic 210 may comprise a truncated packet for a number of different control frames such as an RTS, CTS, PS-Poll, and the like. These truncated packets may be built into the short packet logic 210, or accessible to the short packet logic 210 by a known means.

In such embodiments, the short packet logic 210 may select the truncated packet by selecting an output such as by providing a selection input to a multiplexer or the like. For instance, the short packet logic 210 may select the truncated packet to transmit from a set of truncated packets based upon an association between the truncated packet and an indication from the short packet logic 202.

In further embodiments, the short packet logic 210 may generate a truncated packet to transmit to a receiving device. In some embodiments, the short packet logic 210 may generate the truncated packet to transmit based upon selection of an LTF.

In other embodiments, the acknowledgement determiner 210 may generate a truncated packet to transmit to a receiving device based upon receipt of a preamble or a partial preamble received from the MAC sublayer logic 201.

In many embodiments, the short packet logic 210 may couple with the MAC sublayer logic 201 in parallel with the signal processing logic 208. In several embodiments, the short packet logic 210 may couple with the antenna array 218 in parallel with the signal processing logic 208. In other embodiments, the short packet logic 210 may couple with the antenna array 218 in series with the signal processing logic 208. In further embodiments, the short packet logic 210 may couple with the antenna array 218 in series with at least a portion of the signal processing logic 208.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal. In other embodiments, the transceiver 200 may comprise one or more antennas rather than antenna arrays and, in several embodiments, the receiver 204 and the transmitter 206 may comprise their own antennas or antenna arrays.

The transceiver 200 may comprise a receiver 204 for receiving, demodulating, and decoding information bearing signals. The receiver 204 comprises correlation logic 222 that may take advantage of the repeated symbols of the preamble such as repetitions of the STF, LTF, and/or SIG symbols. The correlation logic 222 may take advantage of the repeated symbols by integrating the incoming signals over the longer or extended period of time associated with the repeated symbols to detect the preamble of a communications signal from a transmitter such as the transmitter 206. The correlation logic 222 may compare the repetitions of the STF, LTF, and/or signal field symbols against known sequences for the STF, LTF and signal field to identify the preamble of the communication signal and, thus, detect the communication signal.

The receiver 204 may comprise a physical layer logic including correlator logic 222 and signal processing logic 226. The correlation logic 222 may correlate data received with preamble symbols such as short training sequences and long training sequences. The correlator logic 222 may also comprise bandwidth (BW) detection logic 223, short packet correlator 224, and prediction logic 225.

In many embodiments, the bandwidth detection logic 223 may detect and receive the OFDM signal and may determine whether the incoming OFDM transmission is a 1 MHz bandwidth transmission or a 2 MHz or greater bandwidth transmission. In some embodiments, the bandwidth detection logic 223 may perform at least some processing of the preamble to determine the bandwidth of the OFDM transmission. During the processing of the preamble, the bandwidth detection logic 223 may detect a property of the orthogonal long training sequences. For instance, the bandwidth detection logic 223 may implement ARG MAX {BDD(R,P)} wherein P is a member of {LTF-1, . . . LTF-N, half-2 MHz-LTF}.

In response to determining whether the incoming signal is a 1 MHz bandwidth or a 2 MHz or greater bandwidth signal, the bandwidth detection logic 223 may inform the prediction logic 225. The prediction logic 225 may receive an indication from the prediction logic 203 of the MAC sublayer logic 201 indicating a packet that the prediction logic 225 expects to receive. For instance, the prediction logic 225 may expect to receive a data packet from an access point in response to transmission by the transceiver 200 of a power saving (PS) poll or other trigger frame to trigger the transmission of the data. In other situations, the prediction logic 225 may expect to receive a short ACK in response to transmitting a data packet to an access point. In such embodiments, the prediction logic 203 may instruct the prediction logic 225 to compare the incoming transmission with a short ACK or a particular LTF that would identify the short ACK or other expected packet.

In response, the prediction logic 225 may inform the correlation logic of the expectation of receipt of the particular LTF such as the LTF-2 associated with the short ACK. The correlation logic 222 may instruct the short packet correlator 224 to compare the incoming transmission to the LTF-2 first to determine if the incoming transmission is a short ACK.

The short packet correlator 224 may, in response, compare the received data with a known LTF for a short ACK. In other situations, the short packet correlator 224 may compare the incoming LTF to other LTFs in memory such as memory 1011, 1031 in FIG. 1.

In some embodiments, the correlation logic 222 may couple in series with the signal processing logic 226 and the antenna array 218. In further embodiments, the correlation logic 222 may couple in parallel with the signal processing logic 226. In other embodiments, the correlation logic 222 may operate partially in parallel with the signal processing logic 226.

The signal processing logic 226 may comprise one or more of an OFDM module 222, a demodulator, a deinterleaver, and a decoder. The OFDM 222 extracts signal information as OFDM symbols from the plurality of subcarriers onto which information-bearing signals are modulated.

The OFDM module may comprise a DBF module and an STBC module. The received signals are fed from antenna elements 218 to the FFT module 219 to transform the communication signals from the time domain to the frequency domain. In some embodiments, correction logic may receive multiple repetitions of the payload symbols and resolve errors in the symbols to determine error-corrected symbols based upon the repetitions of the symbols received by the receiver 204 either prior to or after the FFT module. The DBF module 220 transforms N antenna signals into L information signals. And the STBC module 221 may transform the data streams from the space-time streams to spatial streams. In one embodiment, the demodulation is performed in parallel on the output data of the FFT. In another embodiment, a separate demodulator performs demodulation separately.

The demodulator demodulates the received signal. And, the decoder decodes the received data from the demodulator and transmits the decoded information, the MPDU, to the MAC sublayer logic 201.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, spatial mappers, cyclic shift insertion modules, guard interval insertion modules, synchronization circuitry, possibly multiple frequency conversion stages and multiple amplification stages, etc. Further, some of the functions shown in FIG. 2 may be integrated. For example, digital beam forming may be integrated with orthogonal frequency division multiplexing. The DRAM, cache, buffers, and registers may couple with any component for storing and manipulating data to accomplish data processing discussed herein.

Figure 3A:
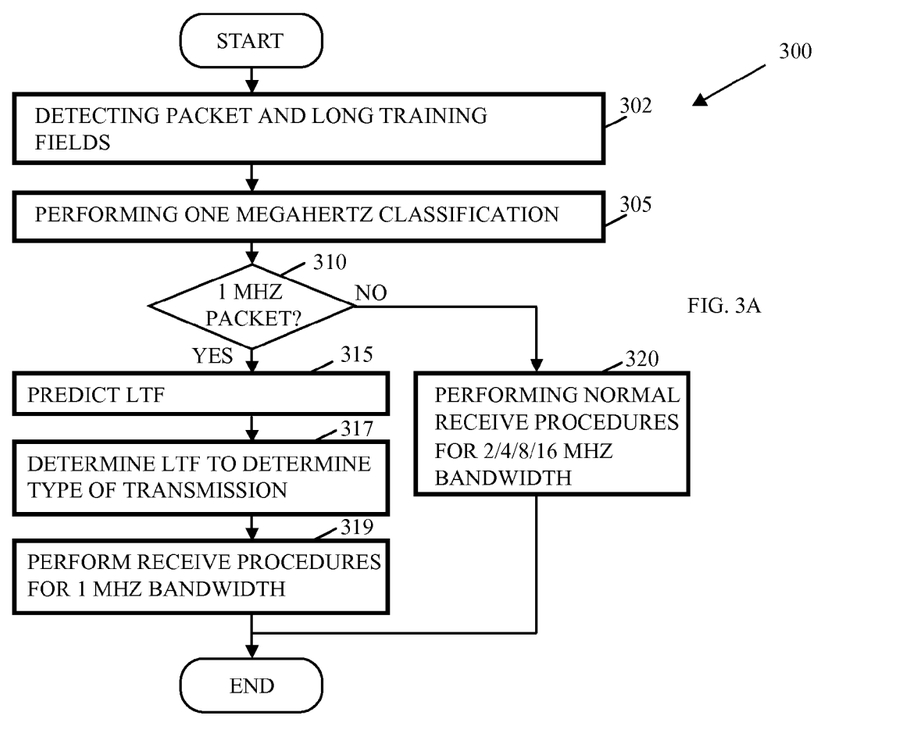
FIGS. 3A-B depict embodiments of flowcharts to receive and decode a transmission and to generate a transmission with a selected long training sequence as illustrated in FIG. 2.
Figure 3B:
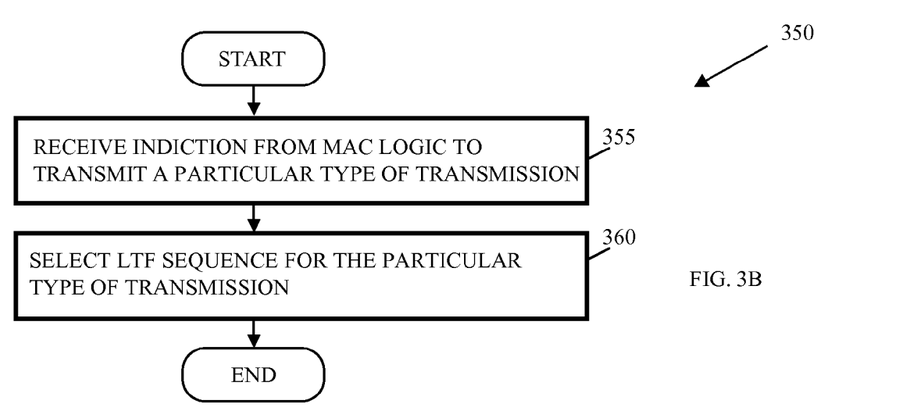

FIGS. 3A-B depict embodiments of flowcharts for orthogonal training sequences and to generate, transmit, receive, parse, and interpret communications. Referring to FIG. 3A, the flowchart 300 may begin with receiving an OFDM packet. After the receiver begins to receive the OFDM packet, the receiver may detect and begin to process the preamble including the long training sequences in the long training fields (element 302). The receiver may detect the energy of the signal and may process a long training field in the preamble to determine initial weight coefficients for equalization.

While processing the preamble, the receiver may perform a 1 MHz classification (element 305). For instance, the receiver may detect the property of orthogonal long training field sequences in the OFDM transmission indication that the transmission is a 1 MHz bandwidth transmission. The property may be that the LTFs defined for the 1 MHz bandwidth mode of operation are differentially orthogonal to each other and differentially orthogonal to each half of a 2 MHz or greater LTF. As a result, the bandwidth can be detected by correlating the LTF of the received signal with one or more of the LTFs defined for the 1 MHz bandwidth mode of operation and half of the LTF defined for the 2 MHz or greater mode of operation. In other embodiments, the receiver may detect that after two long training sequences the subsequent symbol is modulated with Binary Phase Shift Keying (BPSK) rather than Quadrature Binary Phase Shift Keying (QBPSK) indicating that the transmission is a 1 MHz bandwidth transmission.

If the transmission is a 2 MHz bandwidth transmission or greater (element 310), the receiver may follow the normal receive procedures (element 320). For instance, if the transmission is a 2 MHz bandwidth transmission or greater, the receiver may process and decode the packet and transmit the decoded packet to the MAC sublayer logic to parse and interpret.

On the other hand, if the transmission is a 1 MHz bandwidth transmission (element 310), the prediction logic may identify the expected packet LTF (element 315), the correlation logic may correlate the packet to the LTF to determine the type of packet, and the signal processing logic may proceed with the rest of the receive procedures once the packet is identified (element 319). For instance, if the packet is determined to be a short packet, the correlation logic may skip the signal processing and inform the MAC sublayer logic of the packet received. On the other hand, if the short packet requires decoding or the LTF of the incoming packet is associated with a normal packet (rather than a short packet), the packet may be processed by the signal processing logic.

Referring to FIG. 3B, the flowchart 350 begins with a short packet logic receiving an indication from the MAC logic to transmit a short packet (element 355). The MAC logic may indicate the type of the short packet or may indicate the particular LTF to transmit. For instance, the MAC logic may indicate an LTF-2 to indicate to the short packet logic to generate and transmit a short ACK.

In response, the short packet logic may select the LTF sequence for generating the transmission of the, e.g., short ACK, and may transmit the short ACK via one or more antenna(s) such as an antenna element of antenna array 218 (element 360).

Figure 4A:
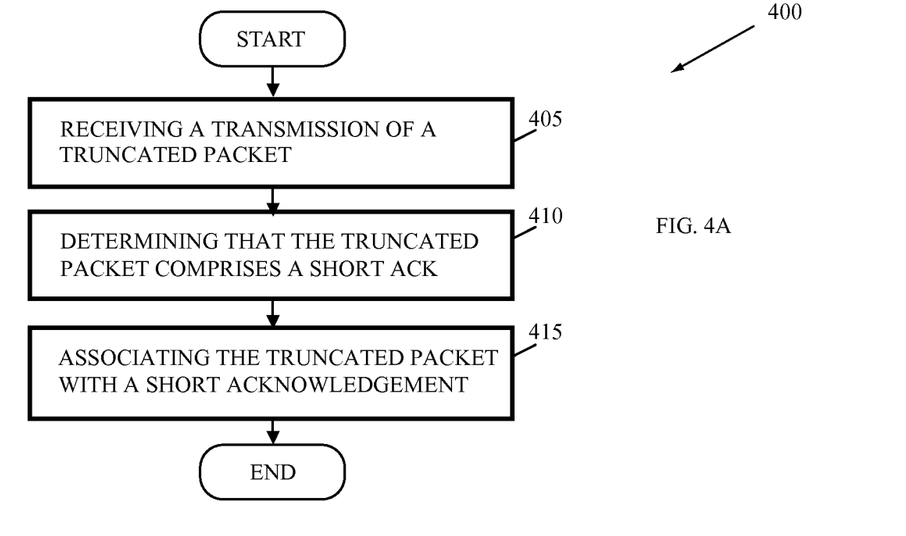
FIGS. 4A-B depict embodiments of flowcharts to transmit and receive communications with a transmitter and a receiver as illustrated in FIG. 2.
Figure 4B:
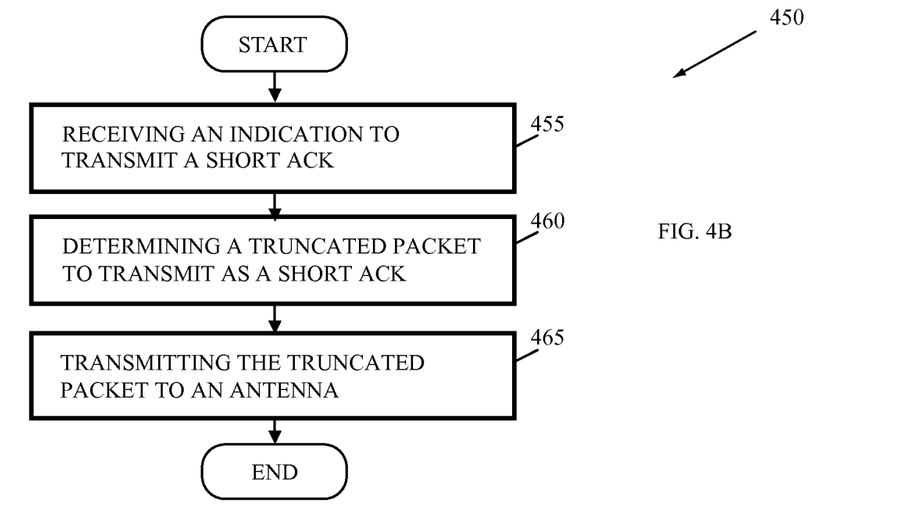

FIGS. 4A-B depict embodiments of flowcharts 400 and 450 to transmit and receive communications with a transmitter and a receiver as illustrated in FIG. 2. Referring to FIG. 4A, the flowchart 400 begins with a receiver such as receiver 204 receiving a transmission of truncated packet (element 405). The receiver may correlate the truncated packet with a known LTF sequence via a short packet correlator to determine if the truncated packet is a short acknowledgement (element 410). Thereafter, the receiver may associate the truncated packet with a short acknowledgement (element 415) and transmit an indication of the short acknowledgement and the association with the particular communications device to the MAC sublayer logic.

Referring to FIG. 4B, the flowchart 450 begins with a physical layer logic such as physical layer logic 1021 in FIG. 1 receiving an indication from a MAC sublayer logic such as MAC sublayer logic 1018 to transmit a short acknowledgement (element 455). The physical layer logic may determine a truncated or short packet to transmit by selecting an LTF to combine with an STF to generate the short packet to output to an antenna (element 460). For instance, the MAC sublayer logic may indicate the transmission of a short ACK by transmitting an index number to the short packet logic of a transmitter. In some embodiments, the short packet logic may use the index to select a short packet, or an LTF therefor, from a number of indexed short packets. In further embodiments, the short packet logic may use the index number as a selection signal to select the short packet, or an LTF therefor, via, e.g., a multiplexor. The physical layer logic may then transmit the short packet to an antenna for transmission (element 465).

The following examples pertain to further embodiments. One example comprises a method. The method may involve receiving an indication to transmit a first type transmission; selecting a first long training sequence to generate the first type transmission, wherein the first long training sequence is associated with the first type transmission in a first bandwidth mode of operation and a second long training sequence is associated with a second type transmission in the first bandwidth mode of operation; and transmitting the first type transmission to an antenna for transmission.

In some embodiments, the method may further comprise transmitting, by an antenna, the first type transmission. In some embodiments, receiving the indication comprises receiving the indication to transmit a short packet. In several embodiments, receiving the indication comprises receiving the indication to transmit a short acknowledgement with a short training field sequence and the first long training field sequence. In several embodiments, selecting the first long training sequence comprises selecting the first long training sequence from a group of more than two long training sequences designed for the first bandwidth mode of operation. In several embodiments, selecting the first long training sequence from the group comprises selecting the first long training sequence the group, wherein each long training sequence in the group is differentially orthogonal to each other and differentially orthogonal to half of a third long training sequence for transmissions in a second bandwidth mode of operation. And, in some embodiments, selecting the first long training sequence comprises selecting the first long training sequence, wherein the first long training sequence is differentially orthogonal to the second long training sequence, the first bandwidth mode of operation comprises a one megahertz bandwidth mode of operation.

Another example comprises an apparatus. The apparatus may comprise a signal processing logic; and packet logic coupled with the signal processing logic to receive an indication to transmit a first type transmission; selecting a first long training sequence to generate the first type transmission, wherein the first long training sequence is associated with the first type transmission in a first bandwidth mode of operation and a second long training sequence is associated with a second type transmission in the first bandwidth mode of operation; and transmitting the first type transmission to an antenna for transmission.

In some embodiments, the apparatus further comprises an antenna coupled with the packet logic to transmit the first type transmission. In some embodiments, the packet logic comprises logic to receive the indication to transmit a short packet. In some embodiments, the packet logic comprises logic to receiving the indication to transmit a short acknowledgement with a short training field sequence and the first long training field sequence. In some embodiments, the packet logic comprises logic to select the first long training sequence from a group of more than two long training sequences designed for the first bandwidth mode of operation. In some embodiments, the packet logic comprises logic to select the first long training sequence the group, wherein each long training sequence in the group is differentially orthogonal to each other and differentially orthogonal to half of a third long training sequence for transmissions in a second bandwidth mode of operation. And, in some embodiments, the packet logic comprises logic to select the first long training sequence, wherein the first long training sequence is differentially orthogonal to the second long training sequence and the first bandwidth mode of operation comprises a one megahertz bandwidth mode of operation.

Another example comprises a system. The system may comprise memory to store an intercept multiplier value; a signal processing logic; and packet logic coupled with the signal processing logic to receive an indication to transmit a first type transmission; selecting a first long training sequence to generate the first type transmission, wherein the first long training sequence is associated with the first type transmission in a first bandwidth mode of operation and a second long training sequence is associated with a second type transmission in the first bandwidth mode of operation; and transmitting the first type transmission to an antenna for transmission.

One example comprises a machine-accessible product. The machine-accessible product may comprise a medium containing instructions, wherein the instructions, when executed by a device, causes the device to perform operations, the operations comprising receiving an indication to transmit a first type transmission; selecting a first long training sequence to generate the first type transmission, wherein the first long training sequence is associated with the first type transmission in a first bandwidth mode of operation and a second long training sequence is associated with a second type transmission in the first bandwidth mode of operation; and transmitting the first type transmission to an antenna for transmission.

One example comprises a method. The method may involve receiving a transmission comprising a first long training sequence, wherein the first long training sequence is associated with the first type transmission in a first bandwidth mode of operation and a second long training sequence is associated with a second type transmission in the first bandwidth mode of operation; and correlating the first long training sequence to identify the first long training sequence is associated with the first type transmission in the first bandwidth mode of operation.

In some embodiments, the method may further comprise determining an expected packet and determining if the transmission comprises the expected packet based upon a comparison with an expected long training sequence, wherein the expected long training sequence comprises the first long training sequence or the second long training sequence. In some embodiments, transmitting an indication of receipt of the first type transmission to a medium access control sub-layer logic. In several embodiments, transmitting the indication of receipt comprises transmitting the indication of receipt of a short packet. In several embodiments, transmitting the indication of receipt comprises transmitting the indication of receipt of a short acknowledgement with a short training field sequence and the first long training field sequence. In several embodiments, receiving the transmission comprises receiving the transmission via an antenna array. And, in some embodiments, correlating the first long training sequence comprises classifying the transmission as the first bandwidth mode of operation based upon the differentially orthogonal properties of the first long training sequence and the second long training sequence being differentially orthogonal to each other and differentially orthogonal to half of a third long training sequence for transmissions in a second bandwidth mode of operation.

Another example comprises an apparatus. The apparatus may comprise a signal processing logic; and correlation logic coupled with the signal processing logic to receive a transmission comprising a first long training sequence, wherein the first long training sequence is associated with the first type transmission in a first bandwidth mode of operation and a second long training sequence is associated with a second type transmission in the first bandwidth mode of operation; and correlate the first long training sequence to identify the first long training sequence is associated with the first type transmission in the first bandwidth mode of operation.

In some embodiments, the apparatus further comprises an antenna coupled with the correlation logic to receive the transmission. In some embodiments, the apparatus further comprising memory coupled with the correlation logic to store more than two long training sequences associated with the first bandwidth mode of operation, wherein each of the more than two long training sequences is associated with different type transmission. In some embodiments, the correlation logic comprises logic to transmit an indication of receipt of the first type transmission to a medium access control sublayer logic. In some embodiments, the logic to transmit the indication of receipt comprises logic to transmit the indication of receipt of a short packet. In some embodiments, the logic to transmit the indication of receipt comprises logic to transmit the indication of receipt of a short acknowledgement with a short training field sequence and the first long training field sequence. And, in some embodiments, the correlation logic comprises a frequency domain, differential detector to classify the transmission as the first bandwidth mode of operation based upon the differentially orthogonal properties of the first long training sequence and the second long training sequence being differentially orthogonal to each other and differentially orthogonal to half of a third long training sequence for transmissions in a second bandwidth mode of operation.

Another example comprises a system. The system may comprise memory to store an intercept multiplier value; a signal processing logic; and correlation logic coupled with the signal processing logic to receive a transmission comprising a first long training sequence, wherein the first long training sequence is associated with the first type transmission in a first bandwidth mode of operation and a second long training sequence is associated with a second type transmission in the first bandwidth mode of operation; and correlate the first long training sequence to identify the first long training sequence is associated with the first type transmission in the first bandwidth mode of operation.

One example comprises a machine-accessible product. The machine-accessible product may comprise a medium containing instructions, wherein the instructions, when executed by a device, causes the device to perform operations, the operations comprising receiving a transmission comprising a first long training sequence, wherein the first long training sequence is associated with the first type transmission in a first bandwidth mode of operation and a second long training sequence is associated with a second type transmission in the first bandwidth mode of operation; and correlating the first long training sequence to identify the first long training sequence is associated with the first type transmission in the first bandwidth mode of operation.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:
1. A method comprising:
receiving an indication to transmit a first packet;
selecting, from a group of two or more long training sequences, a first long training sequence to generate the first packet based upon an association between the first packet and the first long training sequence, wherein each of the two or more long training sequences is defined to cross-correlate to zero with other long training sequences in the group and each of the two or more long training sequences communicate different information, the information being in addition to training; and transmitting the first packet to an antenna for transmission.

2. The method of claim 1, further comprising transmitting, by the antenna, the first packet.

3. The method of claim 1, wherein receiving the indication comprises receiving the indication to transmit a short packet, wherein the first packet is the short packet.

4. The method of claim 1, wherein receiving the indication comprises receiving the indication to transmit a short acknowledgement with a short training sequence and the first long training sequence, wherein the first packet is the short acknowledgement, the short acknowledgement to lack a signal field and lack a payload.

5. The method of claim 1, wherein selecting the first long training sequence comprises selecting the first long training sequence from a group of more than two long training sequences designed for the first bandwidth mode of operation.

6. The method of claim 1, wherein selecting the first long training sequence from the group comprises selecting the first long training sequence a group of more than two long training sequences designed for the first bandwidth mode of operation, wherein each long training sequence in the group is differentially orthogonal to each other and differentially orthogonal to half of a third long training sequence for transmissions in a second bandwidth mode of operation.

7. The method of claim 1, wherein selecting the first long training sequence comprises selecting the first long training sequence, wherein the first long training sequence is differentially orthogonal to a second long training sequence, the first bandwidth mode of operation comprises a one megahertz bandwidth mode of operation.

8. A device comprising:
a signal processing logic comprising circuitry; and
packet logic coupled with the signal processing logic to receive an indication to transmit a first packet; select, from a group of two or more long training sequences, a first long training sequence to generate the first packet based upon an association between the first packet and the first long training sequence, wherein each of the two or more long training sequences is defined to cross-correlate to zero with other long training sequences in the group and each of the two or more long training sequences communicate different information, the information being in addition to training.

9. The device of claim 8, further comprising the antenna coupled with the packet logic to transmit the first packet.

10. The device of claim 8, wherein the packet logic comprises logic to receive the indication to transmit a short packet, wherein the first packet is the short packet.

11. The device of claim 8, wherein the packet logic comprises logic to receive the indication to transmit a short acknowledgement with a short training sequence and the first long training sequence, wherein the first packet is the short acknowledgement, the short acknowledgement to lack a signal field and lack a payload.

12. The device of claim 8, wherein the packet logic comprises logic to select the first long training sequence from a group of more than two long training sequences designed for the first bandwidth mode of operation.

13. The device of claim 8, wherein the packet logic comprises logic to select the first long training sequence in the group, wherein each long training sequence in the group is differentially orthogonal to each other and differentially orthogonal to half of a third long training sequence for transmissions in a second bandwidth mode of operation.

14. The device of claim 8, wherein the packet logic comprises logic to select the first long training sequence, wherein the first long training sequence is differentially orthogonal to a second long training sequence and the first bandwidth mode of operation comprises a one megahertz bandwidth mode of operation.

15. A method comprising:
receiving a transmission comprising a received long training sequence; and
correlating the received long training sequence to identify the received long training sequence in a group of two or more long training sequences and to associate the received long training sequence with a first packet, wherein each of the two or more long training sequences is defined to cross-correlate to zero with other long training sequences in the group and each of the two or more long training sequences communicate different information, the information being in addition to training.

16. The method of claim 15, further comprising determining an expected packet and determining if the transmission comprises the expected packet based upon a comparison of the received long training sequence with an expected long training sequence, wherein the expected long training sequence comprises one sequence from the group of two or more long training sequences.

17. The method of claim 15, further comprising transmitting an indication of receipt of the first packet to a medium access control sublayer logic.

18. The method of claim 17, wherein transmitting the indication of receipt comprises transmitting the indication of receipt of a short packet, wherein the first packet is the short packet.

19. The method of claim 17, wherein transmitting the indication of receipt comprises transmitting the indication of receipt of a short acknowledgement with a short training sequence and the received long training sequence, wherein the first packet is the short acknowledgement, the short acknowledgement lacking a signal field and lacking a payload.

20. The method of claim 15, wherein receiving the transmission comprises receiving the transmission via an antenna array.

21. The method of claim 15, wherein correlating the received long training sequence comprises classifying the transmission as the first bandwidth mode of operation based upon differentially orthogonal properties of the received long training sequence and a second long training sequence being differentially orthogonal to each other and differentially orthogonal to half of a third long training sequence for transmissions in a second bandwidth mode of operation.

22. A device comprising:
a signal processing logic comprising circuitry; and
correlation logic coupled with the signal processing logic to receive a transmission comprising a received long training sequence; and correlate the received long training sequence to identify the received long training sequence in a group of two or more long training sequences and to associate the received long training sequence with a first packet, wherein each of the two or more long training sequences is defined to cross-correlate to zero with other long training sequences in the group and each of the two or more long training sequences communicate different information, the information being in addition to training.

23. The device of claim 22, further comprising memory coupled with the correlation logic to store more than two long training sequences associated with the first bandwidth mode of operation, wherein each of the more than two long training sequences is associated with different packets.

24. The device of claim 22, wherein the correlation logic comprises logic to transmit an indication of receipt of the first packet to a medium access control logic.

25. The device of claim 24, wherein the logic to transmit the indication of receipt comprises logic to transmit the indication of receipt of a short packet, wherein the first packet is the short packet.

26. The device of claim 22, wherein the logic to transmit the indication of receipt comprises logic to transmit the indication of receipt of a short acknowledgement with a short training sequence and the received long training sequence, wherein the first packet is the short acknowledgement, the short acknowledgement to lack a signal field and lack a payload.

27. The device of claim 22, wherein the correlation logic comprises a frequency domain, differential detector to classify the transmission as the first bandwidth mode of operation based upon differentially orthogonal properties of the received long training sequence and a second long training sequence being differentially orthogonal to each other and differentially orthogonal to half of a third long training sequence for transmissions in a second bandwidth mode of operation.

28. A machine-accessible product comprising:
a non-transitory medium containing instructions, wherein the instructions, when executed by a station, causes the station to perform operations, the operations comprising:
receiving an indication to transmit a first packet;
selecting, from a group of two or more long training sequences, a first long training sequence to generate the first packet based upon an association between the first packet and the first long training sequence, wherein each of the two or more long training sequences is defined to cross-correlate to zero with other long training sequences in the group and each of the two or more long training sequences communicate different information, the information being in addition to training; and
transmitting the first packet to an antenna for transmission.

29. The machine accessible product of claim 28, wherein selecting the first long training sequence comprises selecting the first long training sequence from a group of more than two long training sequences designed for the first bandwidth mode of operation.

30. A machine-accessible product comprising:
a non-transitory medium containing instructions, wherein the instructions, when executed by a station, causes the station to perform operations, the operations comprising:
receiving a transmission comprising a received long training sequence; and
correlating the received long training sequence to identify the received long training sequence in a group of two or more long training sequences and to associate the received long training sequence with a first packet, wherein each of the two or more long training sequences is defined to cross-correlate to zero with other long training sequences in the group and each of the two or more long training sequences communicate different information, the information being in addition to training.

* * * * *